Inventors:
Ira A. Weaver
Clyde H. Phelps
By: Walter M. Fuller att.

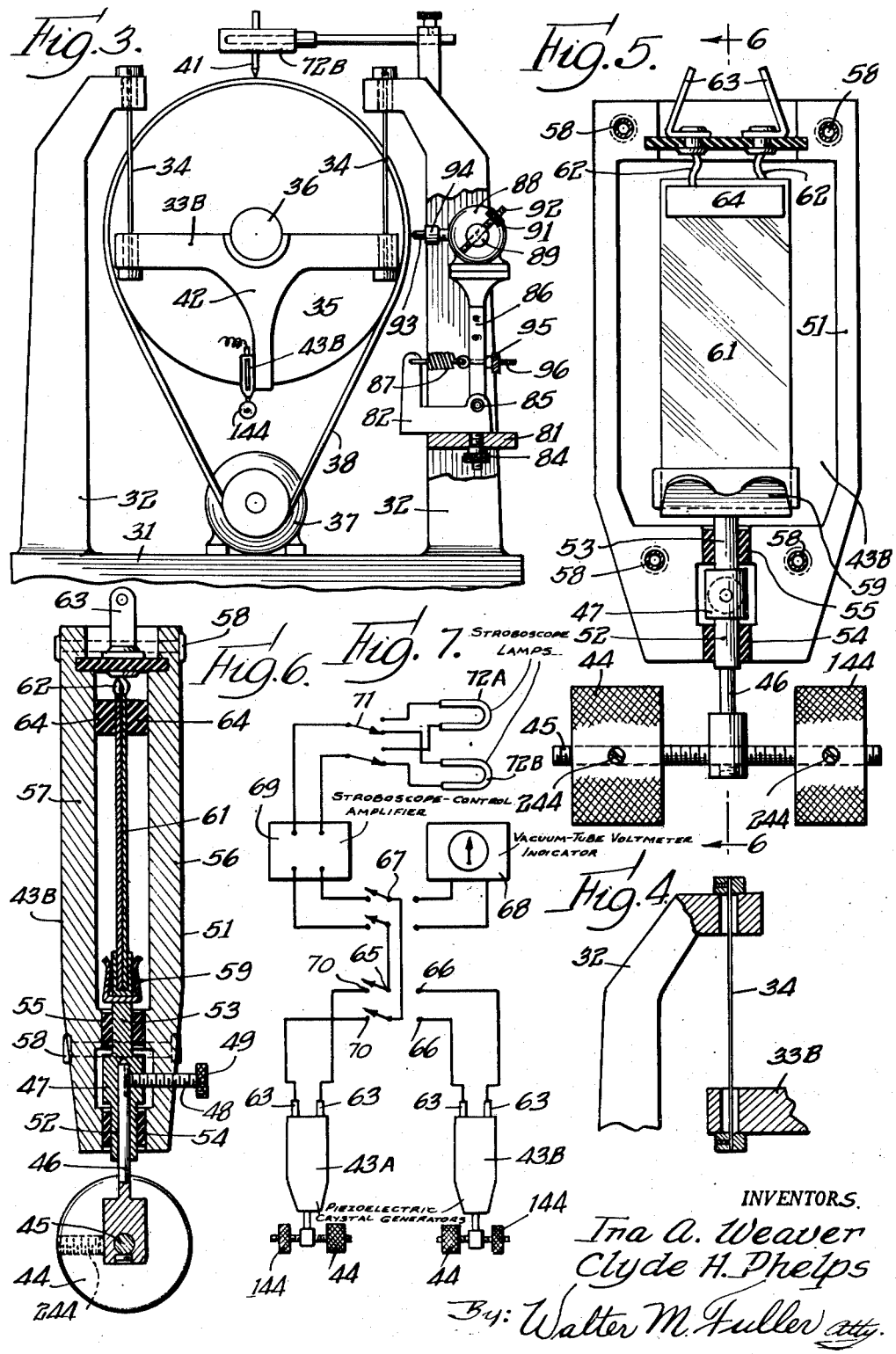

Patented Oct. 27, 1953

2,656,710

UNITED STATES PATENT OFFICE 2,656,710

MEANS FOR ADJUSTMENT OF BALANCING MACHINES

Ira A. Weaver and Clyde H. Phelps, Springfield, Ill., assignors, by mesne assignments, to Gisholt Machine Company, Madison, Wis., a corporation of Wisconsin Application May 29, 1946, Serial No. 673,134

1 Claim. (Cl. 73—1)

The current invention pertains to novel and important betterments and resulting structural and functional advantages in balance-testing systems and the appliances employed for carrying out such procedures, and it relates more particularly to balance examination methods and measures designed and adapted to indicate the unbalance in one or more previously arbitrarily-selected planes-of-correction of the rotor undergoing investigation.

Heretofore, with such balance-testing methods and instruments, the first rotor of a type or form to be tested had to be balanced practically perfectly by trial-and-error procedures necessitating several runs of the balance-testing machine and rotor in order to obtain adequately correct balance.

Such first rotor having been thus completely balanced, known values of unbalance have been attached to the rotor at established angular positions in each correction-plane and the meter or indicating apparatus adjusted so that perfect indications were obtained of the amount of, and angular position of, the attached unbalance weights.

Like or similar rotors, thereafter, have been run and correct indications secured with respect to balance without further trial-and-error methods, since the indicating apparatus or meter had been adjusted or calibrated for the special characteristics of this one particular type or form of rotor.

The tedious, experimental, initial balancing method of the first rotor mentioned is obviously a costly, time-consuming precedure and especially so if the number of rotors to be balanced is comparatively small.

One object of this invention, therefore, is to provide a system and means to eliminate the necessity for the trial-and-error runs of the first rotor of that type, and to make conditions such that the indicating apparatus may be adjusted before the rotor is revolved to supply reliable indications of the amount of unbalance and of its angular position in each selected plane of correction with the first run of the rotor.

A further aim of the invention is the provision of a means to determine quickly the correct adjustment of the meter or indicating apparatus before the rotor is revolved.

To enable those skilled in this art to understand this invention from both structural and functional standpoints, a present preferred embodiment of the invention attaining the foregoing and other valuable purposes and objects has been illustrated in the accompanying drawings forming a part of this specification, and to which reference should be had in connection with the following detailed description, like reference numerals throughout the several views of the drawings, for the sake of simplicity, having been employed to designate the same structural elements.

In such drawings:

Figure 3 is an end elevation of the apparatus;

Figure 4 is a fragmentary detail of the machine;

Figure 5 is a large scale, face view of an uncovered one of the pair of crystal electric generators for operating a vacuum-tube electric-voltmeter;

Figure 6 is a lengthwise central section of the complete generator shown in Figure 5 on line 6—6 of such figure; and Figure 7 presents the electric-circuits in which such generators are used.

Figure 1:
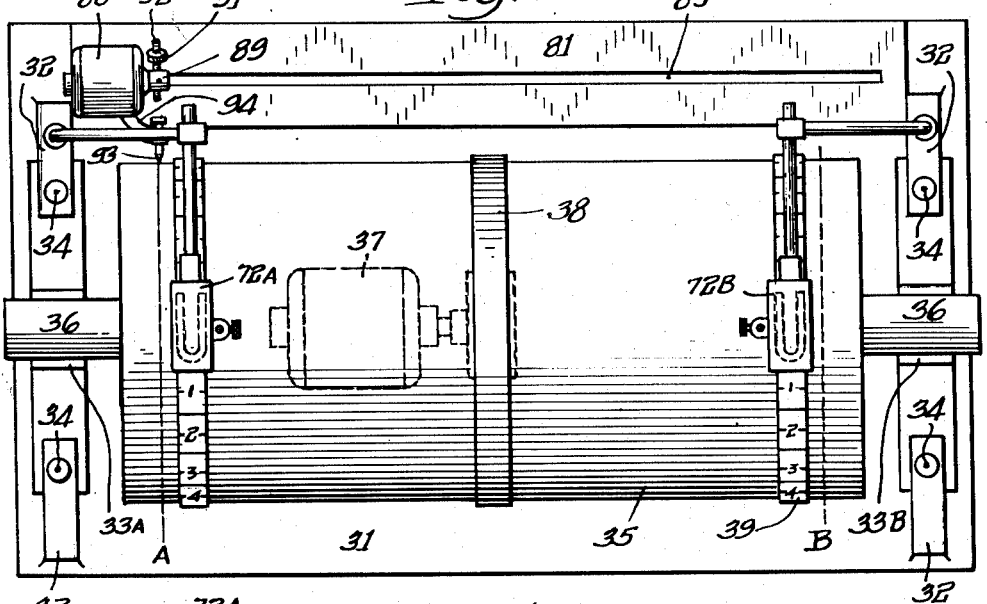
Figure 1 is a plan view of the novel balance-testing machine.
Figure 2:
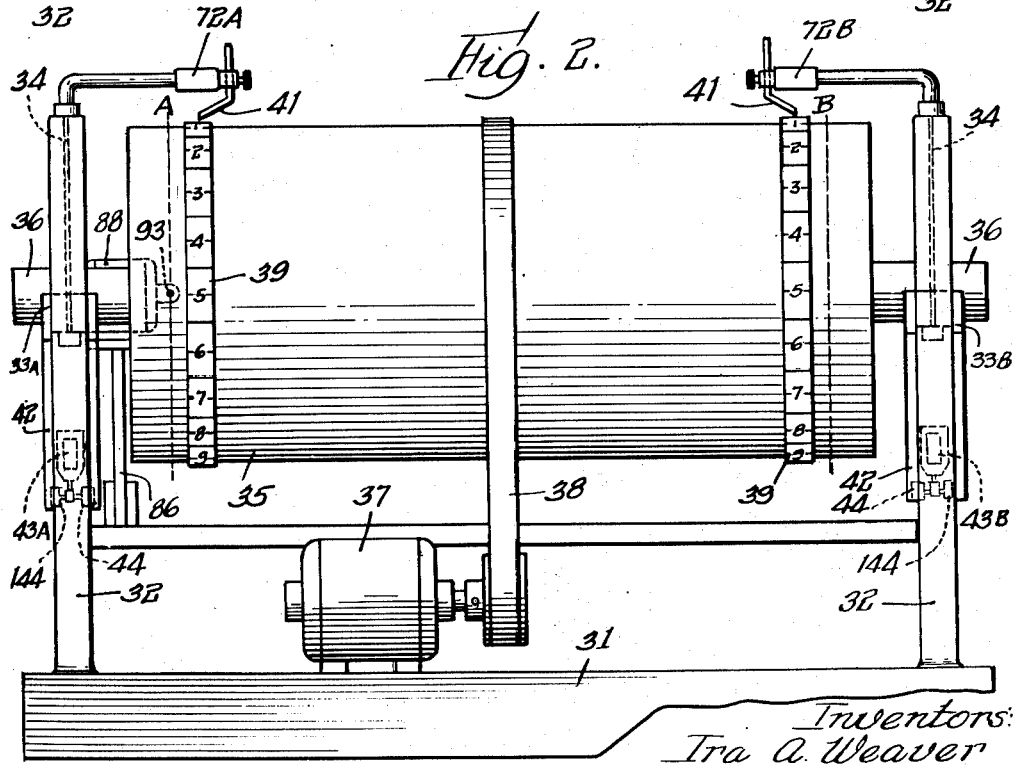
Figure 2 is a front elevation of such appliance with a portion of the base broken away.

By reference to these drawings (Figs. 1, 2, 3) it will be noted that upstanding from and supported by the base 31 of the machine are two pairs of complementary standards or posts 32, 32 located near opposite ends of the apparatus, each such pair of upright members supporting its horizontally vibratory bearing 33A or 33B by means of appropriately mounted depending wires 34, 34, these aligned bearings being adapted to support the rotor 35 to be tested by rotarily accommodating its shaft 36 on which it is mounted.

Such rotor and its shaft are adapted to be rotated in these bearings by an electric-motor 37 on the base 31 (Figs. 2 and 3), the pulley of which motor drives a belt 38 partially encircling the rotor and revolving the latter, the rotor near its opposite ends carrying numerically graduated circular bands 39, 39 around it forming cooperative parts with stroboscopic lamps 72A, 72B, each such band having its own individual stationary pointer or index 41 mounted in any approved manner, as shown (Figs. 1, 2, 3, 7).

Piezoelectric crystal generators 43A and 43B (Figs. 2, 3, 5, 6 and 7) are mounted respectively on depending portions 42, 42 (Fig. 3), of such vibratory or oscillatory bearings 33A and 33B, one of such generators being illustrated in detail in Figures 5 and 6.

Each of these electric-generators has two weights or inertia masses 44 and 144 (Fig. 5)

preferably, but not necessarily, of different values adjustable longitudinally on a horizontal, screw-threaded connection 45 with an upright shaft or pivot 46, the two masses being on opposite sides of such shaft or pivot and each equipped with a set-screw 244 for maintaining it in adjusted longitudinal position on the supporting screw 45.

Shaft 46 (Fig. 6) for the upper portion of its length fits inside of a hollow metal member 47 in which it is demountably retained by an accessible set-screw 48 equipped with a knurled head 49, such part 47 extending into a longitudinally divided housing 51 (Fig. 6).

Such member 47 has two oppositely extended, cylindrical or shaft portions 52 and 53 oscillatory respectively in rubber bearings 54 and 55 in the housing.

The two sections or complementary parts 56 and 57 of the casing 51 are normally held together in assembled relation, as illustrated, by four hollow rivets 58 by means of which the whole appliances may be readily mounted in proper position on the bearings, as by screws, not shown, extending through the apertured rivets (Fig. 5).

The inner end of part 53 is provided with a clamp 59 (Figs. 5 and 6) fitting over and grasping the corresponding end of the flat crystal generator 61 consisting of a pair of thin, rectangular crystals of Rochelle salt, tourmaline, quartz, or other comparable minerals joined together in known manner, the opposite or upper ends of the crystals having wires 62, 62 connected thereto and provided with corresponding external terminals 63, 63, such end portions of the crystals being held between fixed rubber or other comparable elastic or resilient members 64, 64, the construction being such that, when spindle or shaft 46 is turned or rocked on its axis in either direction by the relative oscillatory vibration of the crystals 61 and the weights or masses 44 and 144 around the axis of shaft 46, the crystals are twisted and strained and by reason of that action they create a minor electric voltage, and, as soon as the strain or twist is removed, the crystals elastically return to normal position by reason, at least in part, of the reflex action of the pads 64, 64, the crystals and spindle being then yieldingly held in this neutral position by the friction imposed by the rubber-bearings 54, 55 (Figs. 5 and 6).

Referring now to Figure 7, it will be noted that the two terminals 63 of the crystal device 43A are connected to the two electric-contacts 70, 70 of a double-pole double-throw electric-switch, characterized as a whole 65, the corresponding terminals of the other crystal generator 43B being connected to the other two terminals 66, 66 of the same switch 65.

By suitable wires the blades of switch 65 are joined to those of a second like switch 67, one set of terminals of said switch 67 being connected to a vacuum-tube voltmeter indicator 68, the other terminals of such switch 67 being joined to a stroboscope-control amplifier 69, which, by switch 71, may be connected to either one of the two stroboscope-lamps 72A and 72B, whereby either crystal generator may be operatively connected to the voltmeter or to either stroboscope-lamp.

As to their constructions and modes of operation, the crystal electric generators 43A, 43B, the vacuum-tube voltmeter 68 and the stroboscope-control amplifier 69 are all well-known in the art and are readily purchasable in the market, the amplifier 69 being sold as "Strobotac," and sold by the Geneca Radio Company, Cambridge, Mass.

The vacuum-tube voltmeter 68 is sometimes termed "amplifier-rectifier" vacuum-tube voltmeter which has voltage divider arrangements so that very small or very large voltages A. C. or D. C., may be read on the scale of the meter, the voltage divider control indicating which voltage range is in use. In the present case, however, the voltmeter has two voltage dividers, one for each crystal, and switching means to connect either the crystal 43A and its divider or the crystal 43B and its divider to the vacuum-tube voltmeter; so, in effect, there is a voltmeter for each crystal, the voltage divider means permitting the use of all or any portion of the crystal-generated voltage.

Assuming that the maximum sensitivity of the meter system is say 50 millivolts for a full scale pointer deflection, then 50 millivolts is all that is ever required for full-scale pointer deflection regardless of the value of the output voltage of the crystal as either crystal and its associated voltage divider may be switch connected to the vacuum-tube meter and the voltage divider adjusted to establish a meter calibration for any given value. For example, if one voltage divider for one crystal system is such that the meter pointer indicates one-half scale due to a periodic force applied in one plane to the rotor while the latter is not rotating, it should be clear that a similar force of like value due to actual unbalance while the rotor is revolving would provide a like meter indication, and as the value of the first force is known the similar force of unbalance of equal value is now known and other values are proportional.

Means for periodically applying a known adjustable force to the rotor before any rotation thereof comprises a horizontal plate 81 (Figs. 1 and 3) fixedly mounted on the base of the appliance in any approved manner, such plate having a longitudinal slot 83 (Fig. 1) therethrough parallel to the normal geometric axis of the rotor shaft 36 when the latter is stationary.

A bracket 82 (Fig. 3) is adjustable on and lengthwise of this supporting plate 81 and has a threaded stud extended down through the slot 83 and carrying its tightening nut 84 below the plate by means of which the bracket may be firmly secured in any desired adjusted position along and crosswise of the slot.

Hinged to bracket 82 at 95 with its pivot parallel to the slot is an upstanding arm 86 pulled toward the rotor by a manually adjustable spring 87 connected to the erect arm of the bracket (Fig. 3).

At its top, such arm 86 carries an electric-motor 88 whose shaft, parallel to slot 83, is equipped with a fitting 89 to which an eccentric unbalance weight 91 is threadably and adjustably secured by a radially disposed screw 92 (Fig. 3). The pointed rod 93 fixedly mounted on the motor in the plane of the unbalance weight 91 by the curved arm 94, is, of course, urged toward the rotor by the spring 87 the tension of which is adjustable by nut 95 on the threaded rod 96 to which it is attached.

It will be readily understood from the foregoing that motor 88 and its pointed rod 93 are mounted in such a manner that they and the rotor to be tested are free to vibrate horizontally in the transverse plane of the rotor in consonance with the centrifugal force set up by the rotation of the unbalance weight 91, the active point of rod 93 being in the horizontal plane of the axis of the rotor shaft.

In place of such motor-operated mechanism any other comparable or appropriate construction could be used.

The various successive factors in connection with the practice of the present invention are as follows:

1. Two parallel correction-planes A and B are selected on the vibrationally mounted rotor 35, Figure 1, at right-angles to the axis thereof and preferably near the opposite ends of the rotor.

2. Thereafter, a known periodic-force is applied externally by the unbalanced electric-motor 88 and its pointed vibrator 93 to the non-rotating rotor in the horizontal plane of its axis and in the correction-plane A (Figure 1) at a frequency desirably, but not necessarily, equivalent to the designed, but not then employed, number of revolutions per minute of the rotor when later in actual commercial operation.

3. The crystal electric generator 43B on bearing-member 33B having been connected through switches 65 and 67 to the electric-voltmeter 68, owing to the vibration of bearing 33B, due to the periodically applied force in correction-plane A to the rotor and bearing by the unbalanced electric motor, the weights 44 and 144 of the generator 43B will probably allow oscillation of shaft 46 producing twisting of the crystals and the production of an electric-voltage which will be registered on the face of voltmeter 68. If the mass 144 having a higher velocity than that of the companion mass 44 be adjusted along the common axis of the screw 45 toward or away from the heavier mass 44 having the lower velocity, a point of adjustment between the two masses can be found where the inertia of the smaller mass of greater velocity will equal the inertia of the larger mass of lesser velocity such that zero torque will be applied about the pivot 46 during the vibration or oscillation of the rotor, the two-mass axis 45 will remain parallel to the geometric center-line of the rotor, and, therefore, the unbalance will have zero torque effect about pivot 46. It follows that any voltmeter operable by the movement of the two masses about pivot 46 would provide a zero reading of any unbalance in correction-plane A but would indicate unbalance in any other transverse plane along the geometric axis of the rotor. Accordingly, the operator adjusts the weights 44 and 144 relative to one another to produce such result so that the voltmeter presents zero reading.

4. The unbalanced electric-motor 88 is then shifted for operation in correction-plane B and vibrates the stationary rotor in such correction-plane B.

5. The electric crystal generator 43A of bearing 33A is now electrically connected to the voltmeter 68 instead of generator 43B and the two weights or masses 44 and 144 of generator 43A are adjusted lengthwise relative to one another to produce zero reading of generator 43A on the voltmeter 68.

6. Now while the unbalanced electric motor 88 is still vibrating the rotor in plane B the crystal generator 43B is generating a voltage proportional to this vibration while the other crystal generator 43A at bearing A is not generating any voltage and, therefore, the crystal generator 43B having been connected to the voltmeter and the crystal generator 43A having been disconnected therefrom the former will operate the voltmeter which may now be calibrated or adjusted by its own mechanism to read in terms of weight or force by reason of the fact that the value of the periodically applied force is then known.

7. In order to adjust or calibrate the voltmeter for vibration in correction-plane A, it is now necessary to remove the unbalanced electric-motor 88 and cause it to vibrate the rotor in correction-plane A and then while the electric-generator 43A is connected to the voltmeter, the latter can be calibrated by its own means in terms of weight or force, the adjustment being such that the meter index can be caused to register any amount for the known periodically applied force.

After the foregoing has been accomplished, each weight and crystal combination has been adjusted to respond to unbalance in a single selected transverse plane through the rotor but with no effect from unbalance in another plane, this being of the essence of the balancing procedure.

As any rotor can be brought to complete balance by its correction in two correction-planes, it cannot be balanced in any one plane and, therefore, we have two selected planes A and B in which to add or remove appropriate mass for complete balance and each foregoing crystal and weight adjustment has been made so as to respond to unbalance in its selected plane without effect from unbalance in another plane so that when the unbalance has been corrected in the two planes all unbalance has been corrected and for all planes.

8. Removing the application of the periodic force entirely, the rotor is now rotated at a speed ordinarily equal to the frequency of the previously applied periodic force, or at any appropriate speed provided the voltmeter indicator has been correspondingly adjusted or calibrated and during such rotation the electric generator 43A is connected to the voltmeter 68 and the reading thereon is now proportional to the known periodic force which was applied in correction-plane A from which the meter was calibrated and, therefore, the meter now indicates the unbalance weight or force in the rotor in such correction-plane A.

9. Using this same generated voltage, the stroboscope is connected in the circuit instead of the voltmeter and it flashes at a point of maximum voltage indicating on its associated number strip 39 attached around the rotor the angular position of the unbalanced weight in plane A.

10. Then by connecting the electric generator 43B to the voltmeter the amount of unbalance in correction-plane B is determined.

11. Thereupon by connecting the generator 43B with the stroboscope the angular position of the unbalance weight in correction-plane B is made known in the usual way.

Thus the amounts of weight change required in both correction-planes has been found and their angular positions ascertained so that the rotor can be readily and easily balanced.

Further, as to the voltmeter its indicating means may consist of a single dial as shown in the drawing useable with either crystal electric generator or it may have two dials independently employed for the separate generators. The reason that two dials are employed, one for each generator, is that they may not be exactly of the same capacity for production of allied voltages under equal forces applied thereto.

Those acquainted with this art will readily understand that this invention, as defined by the following claim, is not necessarily limited and restricted to the precise and exact details set forth above and that reasonable modifications may be made therein without departure from the heart and essence of the invention and without the loss or sacrifice of any of its material benefits and advantages.

Whereas the preferred method has been described as employing two electric crystal generators, one for each correction-plane, it is to be borne in mind that one only need be actually employed by shifting it as needed from one position to the other, such system being the full equivalent of the preferred one set forth in detail and therefore incorporating the present invention in a slightly different form.

We claim:

In a rotor balance testing machine, a support for an unbalanced rotor permitting vibratory motion thereof, a pair of axially spaced unbalance indicating devices carried by said support to receive and measure the vibrations of the rotor as related to two corresponding axially spaced selected correction planes, a fixed base adjacent said support and extending longitudinally thereof, and a vibration device adjustably mounted on said base so as to be placed at any one of several positions along the same in the direction longitudinally of the rotor and comprising a lever arm pivotal toward and away from the rotor, a striker carried by said lever and adapted to engage a surface of the rotor in a selected correction plane, spring means biasing said lever in a direction to effect engagement of said striker with the rotor, a rotary motor carried by said lever adjacent said striker, an eccentric inertia-weight adjustably mounted on the motor shaft whereby said motor effects vibration of said lever and striker against the rotor whereby periodic forces of known magnitude may be applied to a stationary rotor at a frequency selected for calibration of said unbalance measuring devices in accordance with vibrations of the rotor resulting from actuation of said striker.

IRA A. WEAVER.
CLYDE H. PHELPS.

References Cited in the file of this patent

UNITED STATES PATENTS

| Number | Name | Date |
|---|---|---|
| Re. 22,416 | Eksergian | Jan. 11, 1944 |
| 1,600,569 | Sperry | Sept. 21, 1926 |
| 2,301,967 | Nosker et al. | Nov. 17, 1942 |
| 2,338,114 | Weaver et al. | Aug. 13, 1943 |
| 2,366,342 | Lazan | Jan. 2, 1945 |
| 2,487,035 | Weaver et al. | Nov. 1, 1949 |
| 2,500,013 | Svensson et al. | Mar. 7, 1950 |
| 2,505,601 | Bender, Jr., et al. | Apr. 25, 1950 |
| 2,531,706 | Signeul | Nov. 28, 1950 |

FOREIGN PATENTS

| Number | Country | Date |
|---|---|---|
| 765,723 | France | June 14, 1934 |
| 664,552 | Germany | Aug. 29, 1938 |

OTHER REFERENCES

A textbook entitled "Vibration Problems in Engineering," by S. Timoshenko, 1st edition. Published by Van Nostrand Company Inc., 250 Fourth Ave., New York, N. Y., Oct. 1928. See pages 19 and 38–47.

Electromagnetic Devices, by H. C. Roters (chapter XIII, art. 116, sec. 1, pages 423, 424), 1941, John Wiley & Sons, Inc., New York, N. Y.